J. W. MAGERS.
Corn Planter.
No. 102,564. Patented May 3, 1870.
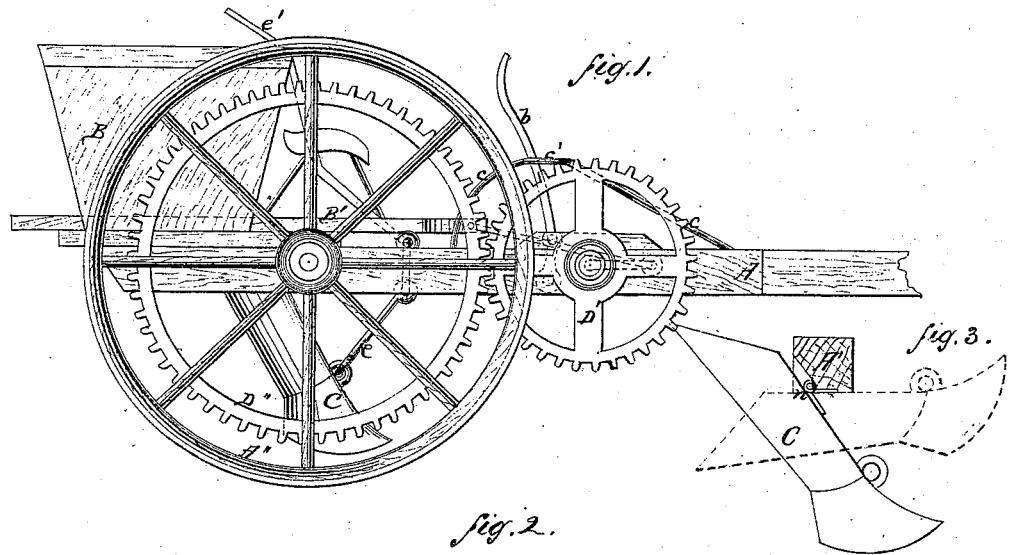
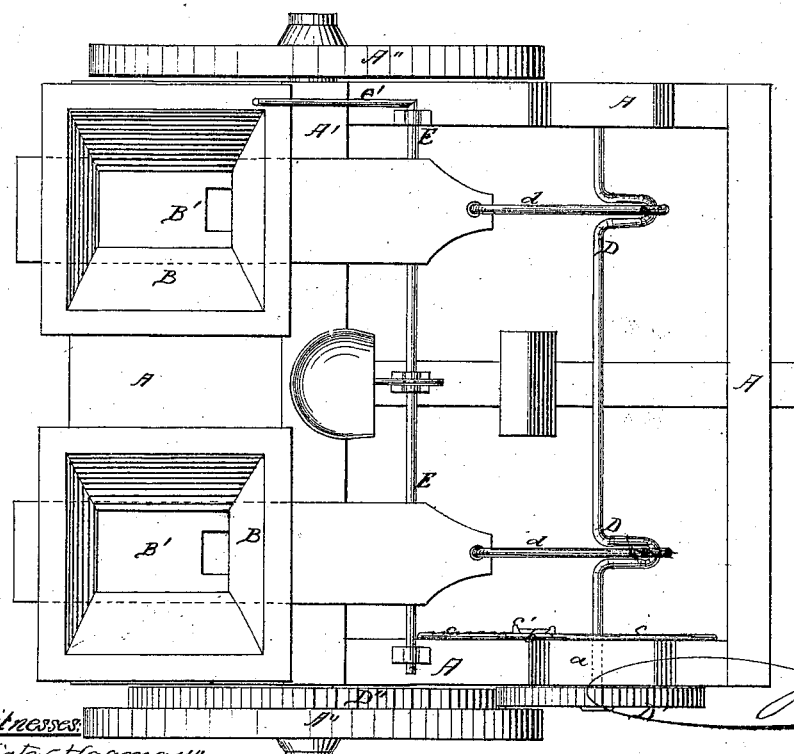

United States Patent Office.

JAMES WILSON MAGERS, OF REINERSVILLE, OHIO

Letters Patent No. 102,564, dated May 3, 1870.

IMPROVEMENT IN CORN-PLANTER

The Schedule referred to in these Letters Patent and making part of the same.

*To all whom it may concern:*

Be it known that I, JAMES WILSON MAGERS, of Reinersville, in the county of Morgan and State of Ohio, have invented a new and improved Corn-Planter; and I do hereby declare that the following is a full, clear, and exact description of the construction and operation of the same, reference being had to the accompanying drawings making a part of this specification, in which—

Figure 1 is a side elevation;
Figure 2 is a plan view; and
Figure 3 is a detached view, showing the manner of attaching the conductor to the axles.

This invention consists of divers improvements in the corn-planter, all tending either to simplify its construction or render it more efficient in operation.

In the drawings—

A is the planter-frame, affixed to the axle A′, and borne on the wheels A″ A″.

B B are the seed-boxes, in the bottom of each of which plays the slide B′, which slides receive the seed in pockets, and drop it into the conductors C, in the usual manner.

The slides are operated by a crank-axle, D, and connecting-rods d.

The crank-axle D is rotated by a cog-wheel, D′, which meshes with a toothed ring, D″, on the master-wheel A″.

One of the boxes, a, which sustain the crank-axle, slides on the side piece of the frame A, so as to throw the cog-wheel D′ in or out of gear with the toothed ring D″. Such sliding of the box is effected by a lever, b, pivoted at its lower end to the side piece A, and jointed to a pin projecting from the sliding-box.

A curved rack, c, projects upward from the side piece, in such contiguity to the lever b that the latter may be placed in either of the sockets c′ of the rack c, and then held, fastening the box a.

There is a second crank-axle, E, placed across the frame A, near the seed-boxes, to the cranks of which axle are jointed the upper ends of connecting-rods e, which are similarly jointed at their lower ends to the front sides of the seed-conductors C.

The axle E has an arm, e′, projecting upward from one end, by means of which the driver may raise the conductors and shovels out of the ground.

The conductors are each attached to the axle by means of a hinge, n, so that they can be turned up into the position shown by dotted lines in fig. 3, so as to be out of the way while the machine is being moved from field to field.

Having thus described my invention
What I claim as new and desire to secure by Letters Patent is—

1. The combination of the crank-axle D, cog-wheel D′, toothed ring D″, sliding box a, lever b, and rack c, in the manner and for the purpose described.

2. The conductors C, attached to the axle A′ by means of hinges n, as and for the purpose specified.

To the above specification of my invention I have signed my hand, this 27th day of January, 1870.

JAMES W. MAGERS.

Witnesses:
GEO. E. BROWN,
SOLON C. KEMON.